United States Patent [19]
Underhill

[11] Patent Number: 6,123,490
[45] Date of Patent: *Sep. 26, 2000

[54] APPARATUS FOR MACHINING ROUND HOLES

[75] Inventor: Jasper Underhill, Sanger, Tex.

[73] Assignee: Halliburton Energy Services, Inc., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/083,319

[22] Filed: May 22, 1998

[51] Int. Cl.$^7$ ....................................... B23B 51/04
[52] U.S. Cl. ........................... 408/204; 408/206; 408/703
[58] Field of Search ..................... 408/204, 506, 408/703

[56] References Cited

U.S. PATENT DOCUMENTS

| | | | |
|---|---|---|---|
| 3,308,689 | 3/1967 | Macdonald | 408/204 |
| 3,591,306 | 7/1971 | Kaser | 408/204 |
| 4,500,234 | 2/1985 | Orth et al. | 408/204 |
| 4,591,303 | 5/1986 | Sato et al. | 408/206 |

OTHER PUBLICATIONS

Sandvik Coromant, Tool Selection Guide 1997, p. 145.
Hougen Manufacturing Co. Inc., The Hougen Commitment to Manufacturing Superior Products, ©1989.
Hougen Industrial Rotabroach Cutters and Accessories, ©1984.
Hougen Industrial Rotabroach Cutters and Accessories Price List, Jan. 1, 1984.
Hougen Manufacturing, Inc., Selection and Use of Industrial Rotabroach Drills, ©1989.
Hougen Manufacturing Company, Inc., Hougen the Hole-making Experts.

*Primary Examiner*—Steven C. Bishop
*Attorney, Agent, or Firm*—William M. Imwalle; John F. Booth

[57] ABSTRACT

A trepanning tool for making holes having a plurality of tool insert holders with pockets wherein replaceable carbide tool inserts are secured by retaining screws, the inserts being positioned so that alternate tool inserts cut overlapping inner and outer portions of a leading surface. Spiral chip relief grooves are provided on the exterior of the trepanning tool to receive cuttings made by each tool insert and remove cuttings from the hole. A tool insert which is positioned to cut the inner portion of the leading surface may be angled to direct cuttings outwardly, toward an adjacent chip relief groove. The flanks of the tool insert holders are cut back to allow access to the retaining screw in the adjacent tool insert holder for tool insert replacement.

9 Claims, 4 Drawing Sheets

APPARATUS FOR MACHINING ROUND HOLES

TECHNICAL FIELD

The present invention relates to the field of metal cutting tools and most particularly, rotary metal cutting tools for machining round holes.

BACKGROUND OF THE INVENTIONS

One of the most common machining requirements in metal working is that of making round holes. The most commonly accepted method for accomplishing this task is by use of a twist drill, a spade drill, an end mill or other tool that reduces the entire volume of the hole to chips. The rotating speed of such tools (RPM) is selected for the best cutting speed considering the material to be worked. The peripheral speed of the tool, which increases in direct proportion to the tool diameter, is the limiting factor for tool RPM. Hence, the tool rotation speed is selected to give the best metal cutting performance at the periphery of the bit, with the result that cutting efficiency necessarily declines toward the center of the hole. Since the cutting speed approaches zero at the hole center, the overall cutting efficiency is relatively low. The hole center is not cut by a drill, but is deformed outwardly to a point where it can be cut. The force required to do this must be provided by axial thrust on the drill. Thus, in drilling any given hole, production time and power consumption requirements are relatively high for the volume of chips generated and, a relatively high axial tool force is required.

The factors that affect the actual horsepower demand are the condition of the tool, the machinability of the material being cut, the efficiency of the machine tool and the rate of metal removal. Taking tool condition and the material being cut to be the same for any hole making process, the variable factors are machine tool efficiency and rate of metal removal. In most production scenarios, neither of these factors is particularly burdensome for conventionally drilled holes, but the larger hole diameters can cause problems, especially where multiple large holes are involved.

Trepanning, wherein a circular groove is cut to produce a round hole, is an alternative particularly suited to larger holes. In this operation, only the metal of the circular groove is cut and made into chips, so the power requirement is inherently much less than required for drilling. Trepanning can be preformed on a lathe, where the work piece rotates with respect to a stationary tool, or on a milling machine, with a rotating tool and a stationary work piece. Specialized cutting tools adapted to perform trepanning are commercially available for use with a drill press or vertical milling machine. These trepanning tools have a plurality of teeth around a hollow center and, like a drill bit, each tool makes only one hole size. A central slug of material remains uncut in the hollow center of the tool. Trepanning proportionately reduces the volume of chips to be cut and requires less power than conventional drilling. Not only is production cycle time reduced significantly, but also other advantages are present, such as the ability to make holes at an oblique angle to the surface of the material and an improved scrap value because of the solid central slug. The central slug must be contained within the length of the cutting tool and, when the hole is completed, the slug must be separated to allow its removal. This limits use of these tools to making through holes in plates no thicker than the tools axial length. In any case, the central slugs are useful as materials testing specimens.

Tool steel trepanning tools are commercially available but face difficulties in cutting harder alloy steels. Re-sharpening these tools is much more difficult than re-sharpening a conventional drill so that most shops send them back to the factory or to an authorized distributor to be reground. Trepanning tools with tungsten carbide cutting tips bonded on the cutting end are available but have also proven to have limited applications. The tungsten carbide cutting tips are necessarily thin and as a consequence are relatively fragile, with a tendency to shatter when used to cut hardened material. The broken toot is either sent back to the factory to be rebuilt or scrapped.

Therefore, the first object of the present invention is to provide an improved apparatus capable of machining holes and central slugs in hard materials. A second object is to provide such a tool in a form that is readily rebuilt by the user when necessary.

SUMMARY OF THE INVENTIONS

The present inventions contemplate improved apparatus for making trepanned holes. Practice of the present inventions uses some steps and apparatus well known in the metal machining arts and therefore, not the subject of detailed discussion herein.

In a preferred embodiment of the present inventions, a trepanning tool is provided for cutting a circular groove in hard metal. The tool has a tubular tool body and a drive shank. The tool body has a plurality of carbide cutting tool inserts mounted in pockets formed in the working end of the tool. The inserts have a cutting face and a back or mounting face. Preferably the inserts and pockets have corresponding shapes. The overall shape can be somewhat rectangular. The pockets are shaped to fit closely against the back and at least one corresponding edge of the inserts to rigidly support the inserts when subjected to high working loads. Preferably, the inserts are removably retained in the pockets. Retainers such as attaching screws can be used. The pockets are positioned in a circular pattern preferably spaced at substantially uniform angles. They are sufficiently spaced to allow in-line, tangential access to each pocket when the retaining screws are used. The retaining screws fit through a mounting bore or opening in the face of the inserts to clamp the insert in the pocket where it is rigidly supported. The pockets are arranged so that the inserts are staggered and alternate in cutting at the inside and outside faces or peripheries of the tubular tool body as it rotates and advances. Thus, each insert has an exposed cutting edge substantially parallel to axis of tool rotation and a radially oriented exposed edge. The inserts are narrower than the groove width so that no one insert cuts both the inside and outside face of the groove. The cutting edge of each insert is included with respect to the axis of tool rotation preferably having a radial extension tip for cutting a leading path in the metal for the tool. Preferably at least four inserts are provided including two inside and two outside periphery cutting inserts. The external surface of the toot body is provided with spiral chip relief groove at each insert. The pockets are positioned to set the rake angle of the inner and outer inserts so as to direct the chips to the relief groove.

BRIEF DESCRIPTION OF THE DRAWINGS

The accompanying drawings are incorporated into and form a part of the specification to assist in explaining the present inventions. The drawings illustrate preferred and alternative examples of how the inventions can be made and used and are not to be construed as limiting the inventions to only those examples illustrated and described. The various advantages and features of the present inventions will be apparent from a consideration of the drawings in which.

DETAILED DESCRIPTION OF THE DRAWINGS

Figure 1:
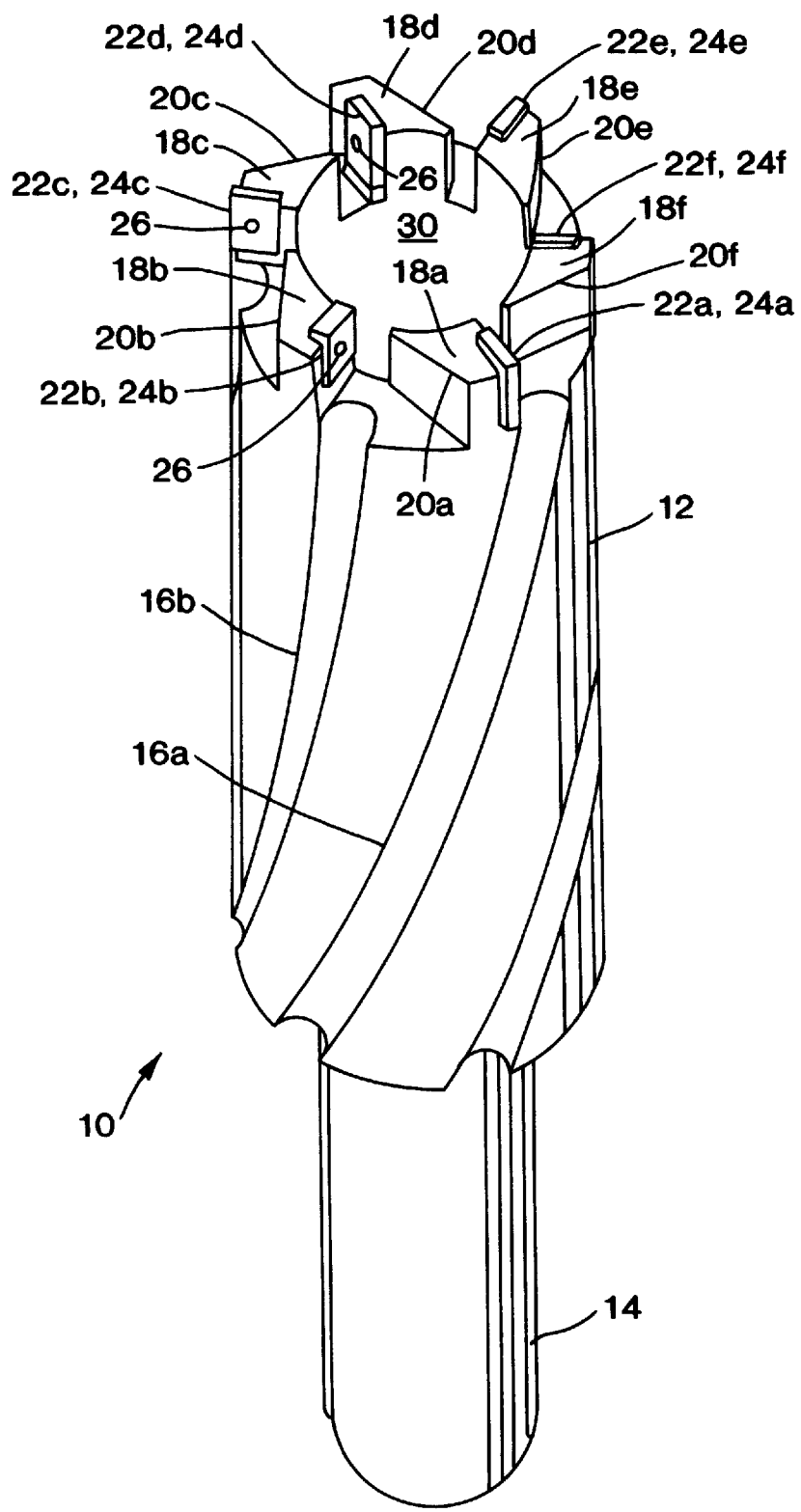
FIG. 1 shows a perspective view of a preferred embodiment of a trepanning tool according to the present inventions.

The embodiments shown and described herein are exemplary. Many details are well known in the art, and as such are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad general meaning of the terms used in the attached claims.

FIG. 1 is illustrative of forms expressing a preferred embodiment of the present inventions. Trepanning tool 10 comprises tubular body 12, preferably made of tool steel and having a hollow interior 30. Trepanning tool 10 cuts an annular groove or hole in a work piece. The depth of hollow interior 30 limits the depth of hole that can be made with trepanning tool 10 and must be considered in specifying such a tool. If the axial depth of interior 30 is sufficient (greater than the thickness of the work piece) the tool 10 can be used to form a cylindrical hole through a work piece by removing a cylindrical plug.

Drive shank 14 extends axially from one end of tool body 12. The shank 14 is used to connect the tool 10 to a drill, lathe or the like. It is to be understood that although not shown the shank 14 could be connected to the tool body by threads, pins or the like and could be of the same external diameter as body 12.

A plurality of tool insert holders 18a–f extend from the other end of the tool 10. Each insert holder 18a–f incorporates an insert receiving and supporting pocket 22a–f, respectively, made to closely conform the shape of a carbide tool insert. Commercially available tool inserts 24a–f, such as made by SANDVIK COROMAT COMPANY, 1702 Nevins Rd., Fairlawn N.J. 07410-0428 as part numbers (GC1020 and GC1120) can be used. The pockets are closely fitting cavities designed to receive and support the inserts. It is to be understood that differently shaped inserts from other sources would require pockets designed to conform to their different shape. Inserts 24a–f are removably mounted in the mating pockets by attaching screws 26 passing through openings in the inserts. While this embodiment shows retaining screw 26 passing through the tool inserts to clamp them in place, it should be understood that externally applied clamps provide an equivalent retaining structure in common machine shop practice and that the present inventions require only that the tool inserts be removably mounted. In the embodiment shown six tool insert holders are shown spaced apart at 60°. Of these six tool holders, three support interior cutting inserts 24b, 24d, and 24f, SANDVIK No. GC1120 and three support exterior cutting inserts 24a, 24c and 24e, SANDVIK No. GC1020. It is believed that as few as four inserts could be used and on larger tools the number of inserts could be substantially larger. According to the present invention at least two interior cutting and two exterior cutting inserts are believed necessary to balance and guide the tool progressively into the cut. In the preferred embodiment six inserts, three interior and three exterior, are used. The flanks 20a–f of tool insert holders 18a–f are cut away at an angle to open up the spaces between adjacent insert holders 18 in a manner that provides access to attaching screws 26 with conventional tools so as to facilitate replacement. Increasing the open space between adjacent insert holders 18 in this manner has a second benefit in providing improved chip relief.

It is notable that tool inserts 24a, 24c and 24e are positioned with cutting edges exposed slightly outside the exterior surface of tubular body 12, while alternating tool inserts 24b, 24d and 24f are positioned with cutting edges exposed slightly inside the interior surface of tubular body 12. Moreover, toot inserts 24a–f extend axially slightly beyond their respective insert holders. Thus, when trepanning tool 10 is driven to rotate by drive shank 14, tool inserts 24a–e cut overlapping inner and outer portions of an annular leading surface of the cut groove. As the leading surface advances or is cut, parallel inner and outer cylindrical surfaces are generated to form the hole and a central slug.

Metal chips and cuttings flow from the cutting edges of the inserts into the spaces between tool insert holders 18a–f. Spiral chip relief grooves 16a–f respectively, extend from these spaces and along the outside surface of body 12 to the shank end thereof. Spiral chip relief grooves 16a–f thus, receive these chips and cuttings and conduct them out of the hole as the tool rotates.

Figure 2:
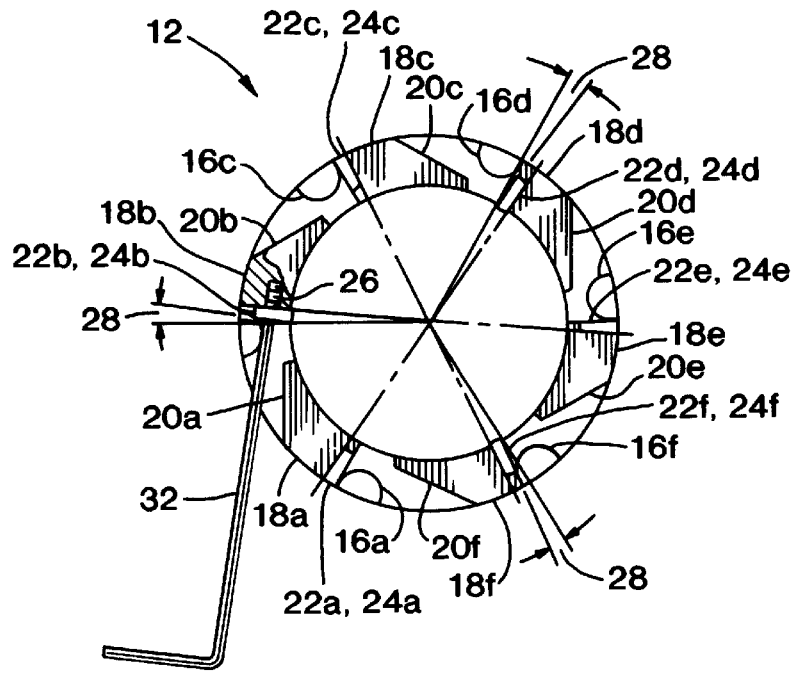
FIG. 2 shows a top plan view of the tool of FIG. 1.

FIG. 2 is an end view of the tool insert holder end of tool body 12, showing the staggered or alternating inside and outside positioning of tool insert pockets 22a–f on tool insert holders 18a–f and cut-away flanks 20a–e. The longitudinal center lid of the tool is identified by reference "c" and radial lines extending from the centerline "r". The tool pockets are shown in this preferred embodiment with the cutting faces set at rake angle 28; in a range of about 7 to 10 degrees off a plane formed by the tool radius. In the preferred embodiment of a one and one-half inch diameter tool, the rake angle is substantially 7 to 7½ degrees. Although not essential, this modified rake angle for tool inserts 24b, 24d and 24f benefits tool operation in helping to direct chips to chip relief grooves 16b, 16d and 16f respectively. It is also shown in FIG. 2 that rake angle 28 improves access of allen wrench 32 to attaching screw 26 to facilitate replacement of inwardly positioned tool inserts 24b, 24d and 24f, which are otherwise more difficult to reach than the outwardly positioned inserts 24a, 24c and 24e.

Figure 3:
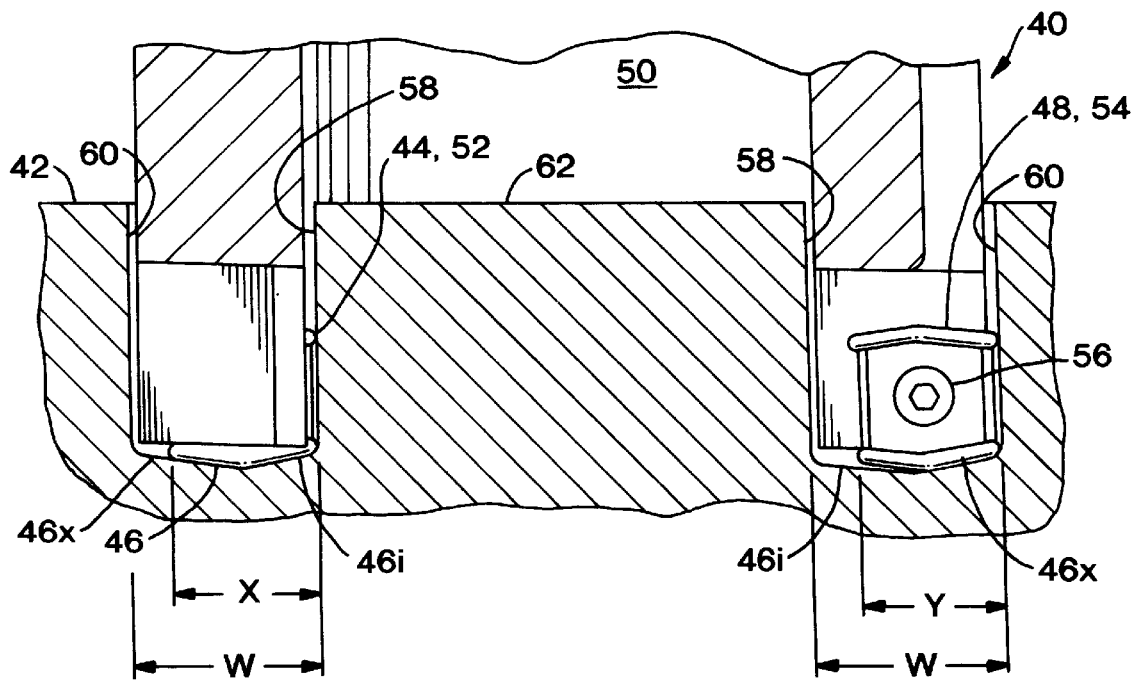
FIG. 3 shows a cross-section view of the working end of the tool in the process of making a hole.

FIG. 3 shows a cross-section view of tubular tool body 40 of the trepanning tool of the present inventions as it appears in the process of making a hole in plate 42 by cutting a cylindrical groove. In the manner previously discussed, tool inserts 44 and 48 are closely fitted into receiving and supporting pockets or recesses 52 and 54 respectively, where they are held by retaining screws 56. Tool 40 is rotating in a clockwise direction so that inwardly positioned tool insert 44 cuts an inner portion 46i of the axially leading groove surface 46 and outwardly positioned tool insert 48 cuts an overlapping outer portion 46x of the axially leading surface groove 46. Thus, as the work advances, cutting leading surface 46 generates parallel inner and outer cylindrical surfaces 58 and 60 respectively and a central slug 62 is formed inside of the hollow interior 50 of tubular tool body 40. The width of the cylindrical groove is represented in FIG. 3 by letter "W," while the cutting width of the inner insert 44 is represented by letter "X" and the cutting width of outer insert 48 is represented by letter "Y." It is important to note that groove width "W" is greater than either insert tool cutting widths "X" and "Y." Also, since the cutting width of inserts 44 and 48 overlap, the sum of width "X" and "Y" is equal to or greater than groove width "W."

Figure 4:
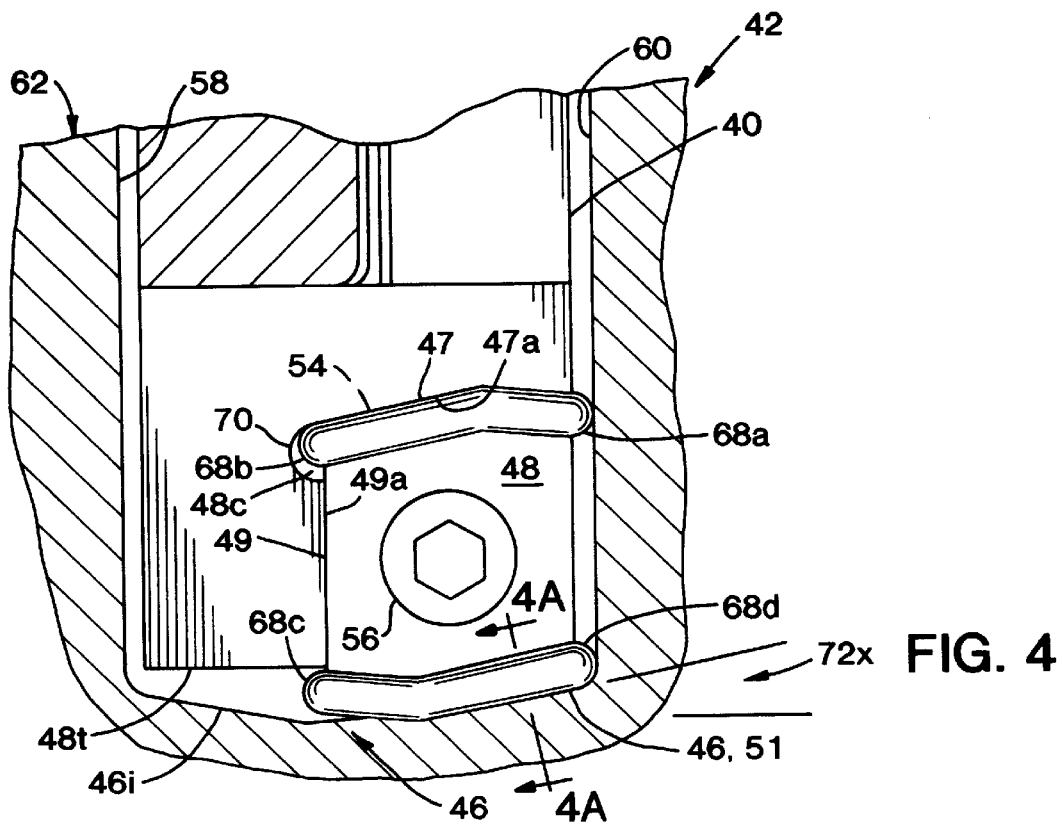
FIG. 4 is an enlarged view of a portion of FIG. 3 showing a radially outwardly cutting tool insert.
Figure 5:
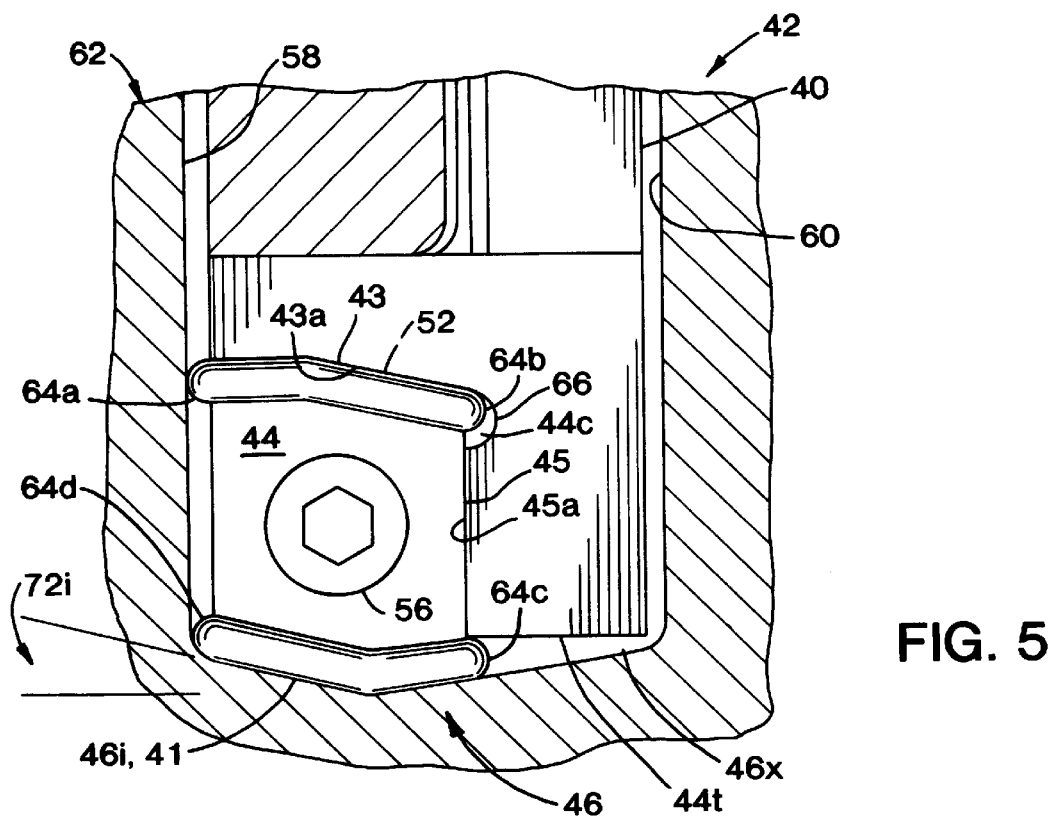
FIG. 5 is an enlarged view similar to FIG. 4 showing a radially inwardly cutting tool insert.

FIG. 4 is an enlarged view of the right hand portion of the section view of plate 42 in FIG. 3. FIG. 5 shows the same section view of plate 42 as tool 40 rotates to bring inwardly positioned tool insert 44 to the location previously shown in FIG. 4 for outwardly positioned tool insert 48.

Figure 4A:
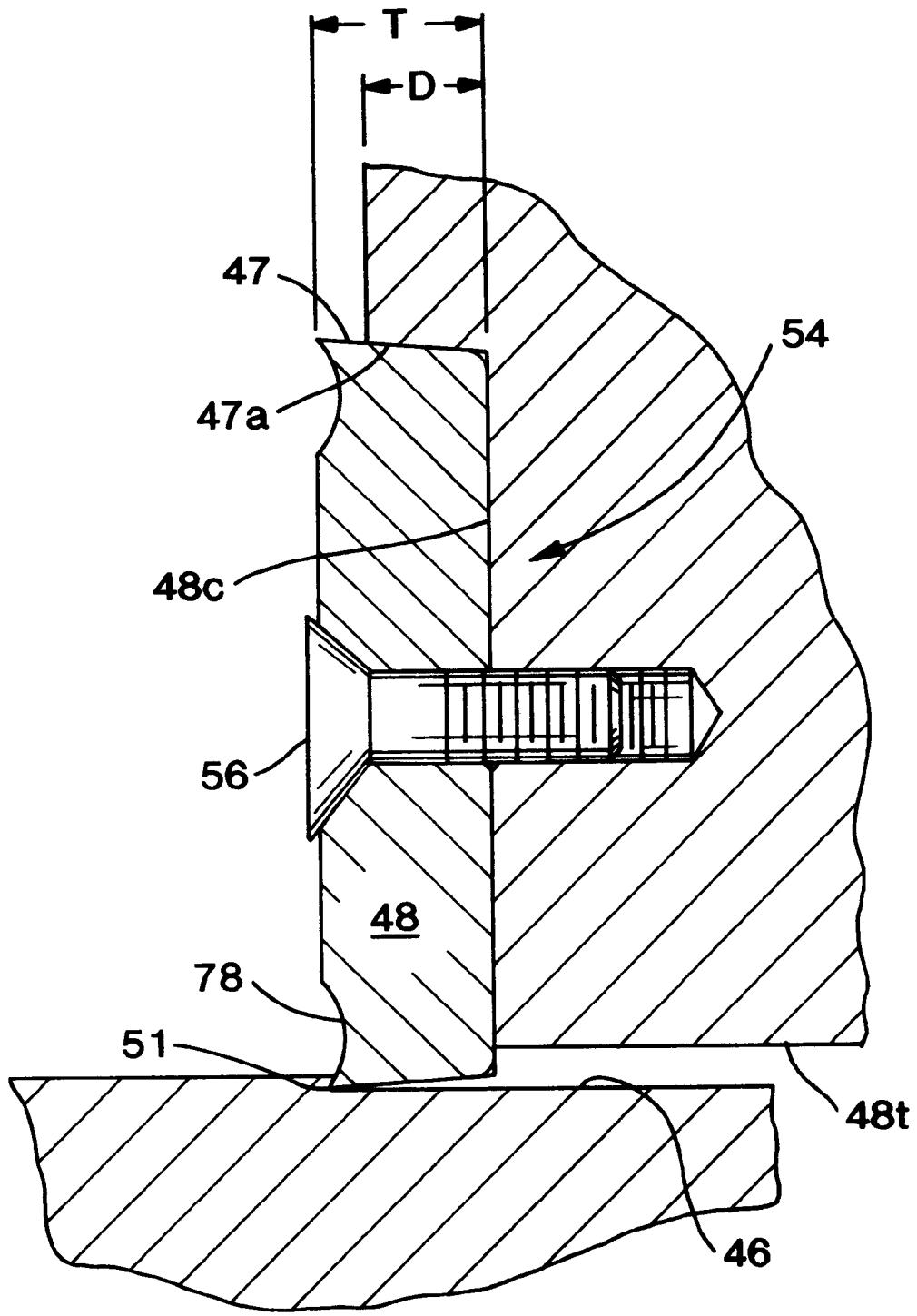
FIG. 4A is a section view taken along plane 4a—4a of FIG. 4.

FIG. 4A shows a cross section view, taken at plane 6—6 of FIG. 4, of cutting edge 51 and the adjacent chip breaking radius 78 of tool insert 48. The effective edge thickness is shown and defined as letter "T" in FIG. 4A. The depth "D" of the pocket at the edge 47a. The pocket depth "D" should be selected to be sufficient to form an edge or shoulder such as edge 47a to abut or contact an edge on the insert. Preferably in the one and one-half inch diameter tool, the depth "D" is at least about 80% of the edge thickness "T".

In FIG. 4, outwardly positioned tool insert 48 is seen to have two outer radiused corner extensions 68a and 68d, and two inner radiused corner extensions 68b and 68c. Radiused corner 70, of recessed pocket 54, provides clearance for inner radiused corner extension 68b. Retaining screw 56 holds tool insert 48 in position against the pocket bottom wall 48c, with the sides 47a and 49a of pocket 54 bearing against tool insert edges 47 and 49 respectively so as to provide rigid support for cutting. The bottom wall is preferably in a plane contouring the centerline of the tool. Pocket mounting sides 47a and 49a are oriented at an approximate right angle to mate with similarly oriented tool insert mounting edges 47 and 49. It is to be noted that opposite edges of tool insert 48 are the same, allowing it to be turned 180 when the cutting edge becomes dull. The depth "D" of the pocket 54 is sufficient to form edges, which mate with edges on the insert 48. It is also shown that cutting edge 51 is set at angle 72x so that outward portion 46x of leading surface 46 is a conical section. This angle is in the range of 10¼ to 10¾ degrees and is preferably about 10½ degrees in the one and one-half inch diameter tool. Leading outer radiused corner extension 68d cuts leading surface 46, so as to make outer cylindrical surface 60, while trailing outer radiused corner extension 68a contacts and guides the tool but does not substantially cut surface 60.

In a similar manner, FIG. 5 shows how second retaining screw 56 acts to hold inwardly positioned tool insert 44 in position against pocket bottom wall 44c. Tool insert 44 is seen to have two inner radiused corner extensions 64a and 64d, and two outer radiused corner extensions 64b and 64c. Radiused corner 66, in pocket 52, provides clearance for outer radiused corner extension 64b. The sides 43a and 45a of pocket 52 bear against tool insert edges 43 and 45 respectively so as to provide rigid support for cutting. It is also shown that cutting edge 41 is set at angle 72i, so that overlapping inward portion 46i of leading surface 46 is also a conical section. This angle is in the range of 11 to 11½ degrees and is preferably about 11¼ degrees in the one and one-half inch diameter embodiment. Leading inner radiused corner extension 64d cuts leading surface 46, so as to make inner cylindrical surface 58, and trailing radiused corner extension 64a merely contacts surface 58 but does not substantially cut the surface 58.

The conical form of inward and outward portions, 46i and 46x respectively, of leading surface 46, have a directionally stabilizing influence on the advancement of tool 40 and this stability is augmented by the trailing contact of radiused extensions 64a and 68a. It is also preferable for directional stability, that there be equal numbers of inwardly positioned and outwardly positioned tool inserts, and that the inserts be uniformly spaced about the tool circumference to have balanced forces. The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad general meaning of the terms used in the attached claims.

The restrictive description and drawings of the specific examples above do not point out what an infringement of this patent would be, but are to provide at least one explanation of how to use and make the inventions. The limits of the inventions and the bounds of the patent protection are measured by and defined in the following claims.

I claim:

1. A tool for trepan machining hard metallic material by forming an endless groove in the material, with the groove having inside and outside cylindrical side walls and an annular bottom wall, the tool comprising:

a plurality of inside and an equal plurality of outside wall cutting inserts of hardened material, the tool inserts are circumferentially spaced and adjacent tool inserts are alternately positioned to cut either the inside or the outside cylindrical side wall, each inside wall cutting insert is positioned circumferentially opposite an outside wall cutting insert, each insert having at least one cutting edge and at least one mounting edge, each insert having a cutting width in the radial direction which is at least one half the total width of the groove but less than the width of the groove;

a tool body having a cutting end, a plurality of insert pockets formed at the cutting end, each pocket having a mounting edge formed therein;

connectors removably mounting one insert in each pocket with the cutting edge on the insert aligned to cut only one side wall of the groove; and the mounting edge on the insert contacting the mounting edge in the insert pocket.

2. A tool for trepan machining hard metallic material according to claim 1 wherein there are at least three inside and three outside inserts and pockets.

3. A tool for trepan machining hard metallic material according to claim 1 wherein the cutting edge on each insert, when mounted, cuts in both the axial and radial directions.

4. A tool for trepan machining hard metallic material according to claim 1 wherein each insert pocket has two mounting edges.

5. A tool for trepan machining hard metallic material according to claim 1 wherein the back wall of each tool insert is planar.

6. A tool for trepan machining hard metallic material according to claim 1 wherein the back wall of each pocket conforms to the tool insert mounted therein.

7. A tool for trepan machining hard metallic material according to claim 1 wherein the tool inserts are wafer shaped.

8. A tool for trepan machining hard metallic material according to claim 1 wherein the insert pockets comprise two mounting edges positioned at an included angle of approximately ninety degrees.

9. A tool for trepan machining hard metallic material according to claim 1 wherein the tool inserts comprise two mounting edges positioned at an included angle of approximately ninety degrees and two cutting edges.

* * * * *